(12) United States Patent
Wang

(10) Patent No.: US 9,358,651 B2
(45) Date of Patent: Jun. 7, 2016

(54) SYSTEM AND METHOD FOR AUTOMATICALLY ADJUSTING A POSITION OF A PANEL ON A CHUCK

(71) Applicant: BOE TECHNOLOGY GROUP CO., LTD., Beijing (CN)

(72) Inventor: Fengchao Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 103 days.

(21) Appl. No.: 14/518,358

(22) Filed: Oct. 20, 2014

(65) Prior Publication Data

US 2015/0343589 A1 Dec. 3, 2015

(30) Foreign Application Priority Data

May 28, 2014 (CN) .......................... 2014 1 0231180

(51) Int. Cl.
*B23Q 15/24* (2006.01)
*B23Q 17/22* (2006.01)
*B23Q 3/18* (2006.01)
(Continued)

(52) U.S. Cl.
CPC ................ *B23Q 15/24* (2013.01); *B23B 31/36* (2013.01); *B23Q 17/2291* (2013.01); *B65G 43/00* (2013.01); *B65G 47/74* (2013.01); *B23Q 3/186* (2013.01); *Y10T 279/21* (2015.01)

(58) Field of Classification Search
CPC .... B23Q 15/24; B23Q 17/2291; B23B 31/36; B65G 47/74; B65G 43/00
USPC .................................................. 700/218, 213
See application file for complete search history.

(56) References Cited

U.S. PATENT DOCUMENTS

| | | | | |
|---|---|---|---|---|
| 4,135,618 A | * | 1/1979 | Kuckhermann | .......... B31B 1/02 198/411 |
| 4,191,916 A | * | 3/1980 | Zasio | ..................... B23Q 15/24 250/559.3 |

(Continued)

FOREIGN PATENT DOCUMENTS

| | | |
|---|---|---|
| CN | 101234702 A | 8/2008 |
| CN | 201845752 U | 5/2011 |

(Continued)

OTHER PUBLICATIONS

First Office Action, including Search Report, for Chinese Patent Application No. 201410231180.4, dated Aug. 31, 2015, 13 pages.

*Primary Examiner* — Patrick Cicchino
(74) *Attorney, Agent, or Firm* — Westman, Champlin & Koehler, P.A.

(57) ABSTRACT

The present disclosure provides a system and method for automatically adjusting a position of a panel on a chuck. The system includes: the chuck having a front end sensor and a rear end sensor arranged respectively on front and rear ends of the chuck in a direction of carrying the panel, and also having an adjustment unit arranged in a central area of the chuck; and a central control apparatus configured to receive a front end trigger signal transmitted by the front end sensor, and judge whether to enable the adjustment unit to adjust the position of the panel on the chuck based on whether a rear end trigger signal transmitted by the rear end sensor is received within a predetermined period of time after the front end trigger signal is received. In this way, the position of the panel with respect to the chuck can be adjusted efficiently, thereby accurately judging a condition of carrying the panel, and thus preventing a machine station from falsely generating an alarm and halt.

10 Claims, 1 Drawing Sheet

(51) Int. Cl.
*B23B 31/36* (2006.01)
*B65G 43/00* (2006.01)
*B65G 47/74* (2006.01)

(56) References Cited

U.S. PATENT DOCUMENTS

| | | | | |
|---|---|---|---|---|
| 4,884,015 A | * | 11/1989 | Sugimoto | B23Q 1/36 |
| | | | | 318/640 |
| 4,888,878 A | * | 12/1989 | Nagasawa | B23Q 1/36 |
| | | | | 318/646 |
| 5,180,975 A | | 1/1993 | Andoh et al. | |
| 7,363,856 B1 | * | 4/2008 | Moulin | G03F 7/2055 |
| | | | | 101/401.1 |
| 7,750,818 B2 | * | 7/2010 | Lee | H01L 21/67259 |
| | | | | 340/686.1 |
| 8,025,475 B2 | * | 9/2011 | Wakabayashi | H01L 21/67748 |
| | | | | 414/744.5 |
| 8,086,348 B2 | * | 12/2011 | Alberti | G03F 7/70633 |
| | | | | 700/218 |
| 2014/0297025 A1 | * | 10/2014 | Foschini | B65G 43/08 |
| | | | | 700/229 |
| 2015/0235881 A1 | * | 8/2015 | Adderly | H01L 21/68 |
| | | | | 29/407.01 |
| 2015/0354594 A1 | * | 12/2015 | Yoshida | F04D 17/122 |
| | | | | 415/118 |

FOREIGN PATENT DOCUMENTS

| | | |
|---|---|---|
| CN | 102610463 A | 7/2012 |
| CN | 102897507 A | 1/2013 |
| JP | 04-048694 B2 | 8/1992 |

\* cited by examiner

SYSTEM AND METHOD FOR AUTOMATICALLY ADJUSTING A POSITION OF A PANEL ON A CHUCK

CROSS-REFERENCE TO RELATED APPLICATION

This Application is a non-provisional Application of Chinese Application No. CN 201410231180.4, filed 28 May 2014 in Chinese, the contents of which are hereby incorporated by reference in their entirety.

TECHNICAL FIELD

The present disclosure relates to the field of mechanical automation control, and in particular, to a system and method for automatically adjusting a position of a panel on a chuck.

BACKGROUND

With the continuous development of display technology, a large-sized screen is increasingly popular in users. During the manufacturing process, in order to ensure that a large-sized display panel can be accurately and quickly delivered among different machine stations in a smooth manner, a mechanical robot is used as a carrying tool on a production line in most cases, thereby assuring fast operation of the production line.

It has been found in the process of practical production that the mechanical robot can only deliver the panel up, down, left and right, and once the panel is placed on the chuck, a position of the panel on the chuck cannot be adjusted. Conventionally, two sensors are arranged on front and rear ends of the chuck. It is often erroneously considered that there is no panel on the chuck thereby causing a machine station to falsely generate an alarm or halt, when the panel arrives at a sensor on the front end but does not arrive at the sensor on the rear end. Thereby, the whole production line is forced to stop, resulting in an economic loss.

SUMMARY

Technical Problem to be Solved

The purpose of the present disclosure is to provide a system and method for automatically adjusting a position of a panel on a chuck, to solve the defects that a conventional chuck cannot automatically adjust the position of the panel placed on the chuck thereby causing a machine station to falsely generate an alarm or halt, which results in stopping the whole production line.

Technical Solution

In order to achieve the above purpose, an aspect of the present disclosure provides a system for automatically adjusting a position of a panel on a chuck, comprising:

the chuck having a front end sensor and a rear end sensor arranged respectively on front and rear ends of the chuck in a direction of carrying the panel, and having an adjustment unit arranged in a central area of the chuck; and a central control apparatus configured to receive a front end trigger signal transmitted by the front end sensor, determine whether a rear end trigger signal transmitted by the rear end sensor is received within a predetermined period of time after the front end trigger signal is received, and judge whether to enable the adjustment unit to adjust the position of the panel on the chuck based on a result of the determination.

Preferably, the central control apparatus is configured to enable the adjustment unit to adjust the position of the panel on the chuck when determining that the rear end trigger signal is not received within the predetermined period of time.

Preferably, the central control apparatus is configured to indicate that carrying of the panel is completed when determining that the rear end trigger signal is received within the predetermined period of time.

Preferably, the adjustment unit is configured to adjust an end position of the panel to a position where the rear end sensor can be triggered to transmit the rear end trigger signal.

Preferably, the adjustment unit comprises a motor.

Preferably, the motor is a directional motor with Polyvinyl Chloride polymer (PVC) wheels.

In another aspect, the present disclosure further provides a method for automatically adjusting a position of a panel on a chuck, wherein the chuck has a front end sensor and a rear end sensor arranged respectively on front and rear ends of the chuck in a direction of carrying the panel, and has an adjustment unit arranged in a central area of the chuck, the method comprising:

receiving a front end trigger signal transmitted by the front end sensor;

determining whether a rear end trigger signal transmitted by the rear end sensor is received within a predetermined period of time after the front end trigger signal is received; and judging whether to enable the adjustment unit to adjust the position of the panel on the chuck based on a result of the determination.

Preferably, the adjustment unit is enabled to adjust the position of the panel on the chuck when it is determined that the rear end trigger signal is not received within the predetermined period of time.

Preferably, it is indicated that carrying of the panel is completed when it is determined that the rear end trigger signal is received within the predetermined period of time.

Preferably, adjusting the position of the panel on the chuck comprises:

adjusting an end position of the panel to a position where the rear end sensor can be triggered to transmit the rear end trigger signal.

Beneficial Effects

With the system and method for automatically adjusting a position of a panel on a chuck, it is judged whether to enable an adjustment unit to adjust a position of a panel on a chuck based on whether a rear end trigger signal transmitted by a rear end sensor is received within a predetermined period of time after a front end trigger signal transmitted by a front end sensor is received. In this way, the position of the panel with respect to the chuck can be adjusted efficiently, thereby accurately judging a condition of carrying the panel, and thus preventing a machine station from falsely generating an alarm and halting.

DETAILED DESCRIPTION OF THE EMBODIMENTS

Specific implementations of the present disclosure will be further described in detail below in conjunction with accompanying drawings and embodiments. The embodiments below are used to illustrate the present disclosure, instead of limiting the scope of the present disclosure.

Figure 1:
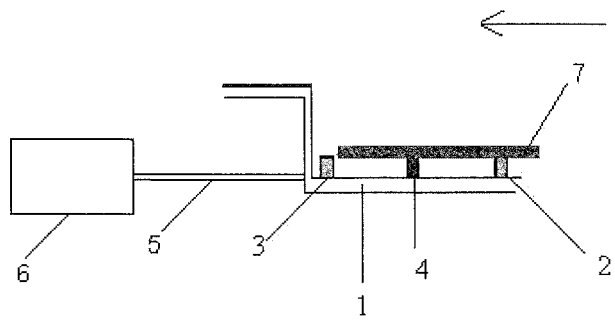
FIG. 1 is a structural diagram of a system according to an example embodiment of the present disclosure.

As shown in FIG. 1, illustrated is a system 10 for automatically adjusting a position of a panel on a chuck according to an example embodiment of the present disclosure. The system 10 includes a chuck 1, an interface cable 5 and a central control apparatus 6. The chuck 1 has a front end sensor 2 and a rear end sensor 3 arranged respectively on front and rear ends of the chuck 1 in a direction of carrying a panel 7 (direction of arrow in FIG. 1), and also has an adjustment unit 4 arranged in a central area of the chuck 1. A mechanical robust (not shown) delivers the panel 7 from the front end of the chuck 1 onto the chuck 1. The front end sensor 2 arranged on the front end of the chuck 1 transmits a front end trigger signal to the central control apparatus 6 through the interface cable 5 when sensing the arrival of the panel 7. Similarly, the rear end sensor 3 arranged on the rear end of the chuck 1 also transmits a rear end trigger signal to the central control apparatus 6 through the interface cable 5 when sensing the arrival of the panel 7.

The central control apparatus 6 receives a front end trigger signal transmitted by the front end sensor 2, determines whether a rear end trigger signal transmitted by the rear end sensor 3 is received within a predetermined period of time after the front end trigger signal is received, and judges whether to enable the adjustment unit 4 to adjust the position of the panel on the chuck 1 based on a result of the determination. The predetermined period of time may be for example 25-35 ms, and preferably, 30 ms. However, those skilled in the art can make amendments to the predetermined period of time according to actual conditions. The predetermined period of time is not specifically defined in the present disclosure.

Specifically, the central control apparatus 6 enables the adjustment unit 4 to adjust the position of the panel 7 on the chuck 1, when the central control apparatus 6 determines that the rear end trigger signal is not received within the predetermined period of time. The central control apparatus 6 indicates that carrying of the panel 7 is completed, when the central control apparatus 6 determines that the rear end trigger signal is received within the predetermined period of time.

In practical applications, the adjustment unit 4 may preferably be implemented by a motor, and more preferably, by a directional motor with Polyvinyl Chloride polymer (PVC) wheels. The panel 7 arrives at the rear end sensor 3 on the chuck 1 in a direction of arrow in FIG. 1 under a driving force of the motor, so that an end position of the panel 7 is adjusted to a position where the rear end sensor 3 can be triggered to transmit a rear end trigger signal. In this way, the process of adjusting the position of the panel 7 on the chuck 1 is implemented. Thus, the problem that a conventional chuck cannot automatically adjust the position of the panel placed on the chuck thereby causing a machine station to falsely generate an alarm or halt is solved.

The present disclosure further provides a method for automatically adjusting a position of a panel on a chuck, wherein, the chuck has a front end sensor and a rear end sensor arranged respectively on front and rear ends of the chuck in a direction of carrying the panel, and has an adjustment unit arranged in a central area of the chuck, the method comprising:

receiving a front end trigger signal transmitted by the front end sensor;

determining whether a rear end trigger signal transmitted by the rear end sensor is received within a predetermined period of time after the front end trigger signal is received; and judging whether to enable the adjustment unit to adjust a position of the panel on the chuck based on a result of the determination.

Preferably, the adjustment unit is enabled to adjust the position of the panel on the chuck when it is determined that the rear end trigger signal is not received within the predetermined period of time; and it is indicated that carrying of the panel is completed when it is determined that the rear end trigger signal is received within the predetermined period of time.

Preferably, adjusting the position of the panel on the chuck includes adjusting an end position of the panel to a position where the rear end sensor can be triggered to transmit a rear end trigger signal.

Figure 2:
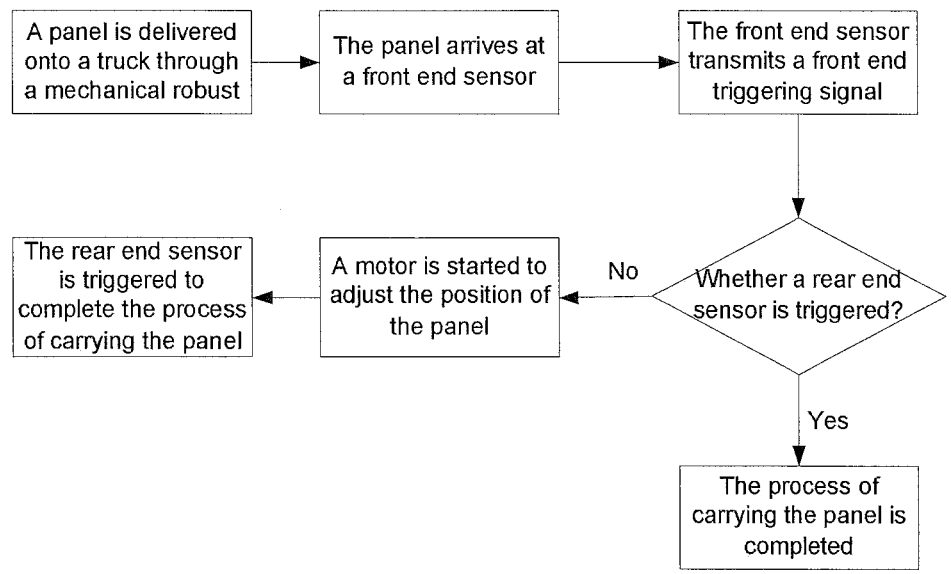
FIG. 2 is a schematic diagram of an operating principle of automatically adjusting a position of a panel on a chuck according to an example embodiment of the present disclosure.

The operating principle of automatically adjusting a position of a panel on a chuck will be described in detail below with reference to FIG. 2.

(1) the panel is delivered from a front end of the chuck onto the chuck through a mechanical robust, and a front end sensor arranged on the front end of the chuck transmits a front end trigger signal to a central control apparatus when sensing the arrival of the panel 7;

(2) the central control apparatus calculates the position of the panel with respect to the chuck according to the front end trigger signal transmitted by the front end sensor, and waits for a rear end trigger signal transmitted by a rear end sensor arranged on a rear end of the chuck;

(3) if the rear end trigger signal is not received within a predetermined period of time after the front end trigger signal is received, a data calculating module and a signal processing module in the central control apparatus discovers that the rear end trigger signal is not triggered, and immediately starting a motor on the chuck to adjust a position of the panel with respect to the chuck, so that the panel moves on the chuck in a direction of arrow in FIG. 1;

(4) the rear end sensor transmits a rear end trigger signal when the panel arrives at the rear end sensor under the drive of the motor, thereby completing the process of adjusting the position of the panel.

With the system and method for automatically adjusting a position of a panel on a chuck, it is judged whether to enable an adjustment unit arranged in a central area of the chuck to adjust a position of a panel on a chuck based on whether a rear end trigger signal transmitted by a rear end sensor arranged on a rear end of the chuck is received within a predetermined period of time after a front end trigger signal transmitted by a front end sensor arranged on a front end of the chuck is received. In this way, the position of the panel with respect to the chuck can be adjusted efficiently, thereby accurately judging a condition of carrying the panel, and thus preventing a machine station from falsely generating an alarm and halting.

The above description is only the preferable implementations of the present disclosure. It should be noted that a number of changes and variations may further be made by those of ordinary skill in the art without departing from the technical principle of the present disclosure, and these changes and variations should be construed to be included in the protection scope of the present disclosure.

What is claimed is:

1. A system for automatically adjusting a position of a panel on a chuck, comprising:

the chuck having a front end sensor and a rear end sensor arranged respectively on front and rear ends of the chuck in a direction of carrying the panel, and having an adjustment unit arranged in a central area of the chuck; and a central control apparatus configured to receive a front end trigger signal transmitted by the front end sensor, determine whether a rear end trigger signal transmitted by the rear end sensor is received within a predetermined period of time after the front end trigger signal is received, and judge whether to enable the adjustment unit to adjust the position of the panel on the chuck based on a result of the determination.

2. The system according to claim 1, wherein the central control apparatus is configured to enable the adjustment unit to adjust the position of the panel on the chuck when determining that the rear end trigger signal is not received within the predetermined period of time.

3. The system according to claim 1, wherein the central control apparatus is configured to indicate that carrying of the panel is completed when determining that the rear end trigger signal is received within the predetermined period of time.

4. The system according to claim 2, wherein the adjustment unit is configured to adjust an end position of the panel to a position where the rear end sensor can be triggered to transmit the rear end trigger signal.

5. The system according to claim 1, wherein the adjustment unit comprises a motor.

6. The system according to claim 5, wherein the motor is a directional motor with Polyvinyl Chloride polymer (PVC) wheels.

7. A method for automatically adjusting a position of a panel on a chuck, wherein the chuck has a front end sensor and a rear end sensor arranged respectively on front and rear ends of the chuck in a direction of carrying the panel, and has an adjustment unit arranged in a central area of the chuck, the method comprising:

receiving a front end trigger signal transmitted by the front end sensor;

determining whether a rear end trigger signal transmitted by the rear end sensor is received within a predetermined period of time after the front end trigger signal is received; and judging whether to enable the adjustment unit to adjust the position of the panel on the chuck based on a result of the determination.

8. The method according to claim 7, wherein the adjustment unit is enabled to adjust the position of the panel on the chuck when it is determined that the rear end trigger signal is not received within the predetermined period of time.

9. The method according to claim 7, wherein it is indicated that carrying of the panel is completed when it is determined that the rear end trigger signal is received within the predetermined period of time.

10. The method according to claim 8, wherein adjusting the position of the panel on the chuck comprises:

adjusting an end position of the panel to a position where the rear end sensor can be triggered to transmit the rear end trigger signal.

* * * * *